(12) United States Patent
Kaun

(10) Patent No.: US 9,065,118 B1
(45) Date of Patent: Jun. 23, 2015

(54) THERMAL BATTERY WITH POLYMER-BASED CONSTRUCTION

(76) Inventor: Thomas D. Kaun, New Lenox, IL (US)

( * ) Notice: Subject to any disclaimer, the term of this patent is extended or adjusted under 35 U.S.C. 154(b) by 432 days.

(21) Appl. No.: 13/463,203

(22) Filed: May 3, 2012

Related U.S. Application Data

(63) Continuation-in-part of application No. 12/315,210, filed on Dec. 1, 2008, now Pat. No. 8,313,853.

(60) Provisional application No. 61/482,125, filed on May 3, 2011.

(51) Int. Cl.
H01M 2/14 (2006.01)
H01M 2/16 (2006.01)
H01M 6/30 (2006.01)
H01M 6/36 (2006.01)
H01M 10/39 (2006.01)

(52) U.S. Cl.
CPC .......... *H01M 2/1613* (2013.01); *H01M 10/399* (2013.01); *H01M 2/145* (2013.01); *H01M 6/36* (2013.01); *H01M 6/30* (2013.01); *H01M 2/14* (2013.01)

(58) Field of Classification Search
USPC .......................................................... 429/112
See application file for complete search history.

(56) References Cited

U.S. PATENT DOCUMENTS

| | | |
|---|---|---|
| 3,668,059 A | 6/1972 | Economy et al. |
| 4,104,395 A | 8/1978 | Frankel |
| 4,260,667 A | 4/1981 | Miles et al. |
| 4,284,610 A | 8/1981 | Hamilton |
| 4,354,986 A | 10/1982 | Maczuga et al. |
| 4,992,341 A | 2/1991 | Smith et al. |
| 5,382,479 A | 1/1995 | Schuster |
| 5,714,283 A | 2/1998 | Briscoe et al. |
| 6,447,958 B1 | 9/2002 | Shinohara et al. |
| 6,544,691 B1 | 4/2003 | Guidotti |
| 7,629,075 B2 | 12/2009 | Miles |
| 7,807,286 B2 | 10/2010 | Hennige et al. |
| 7,871,447 B2 | 1/2011 | Dixon et al. |
| 8,313,853 B2 | 11/2012 | Kaun |
| 2007/0099080 A1 | 5/2007 | Pickett, Jr. et al. |
| 2007/0100012 A1 | 5/2007 | Beard |
| 2009/0181292 A1 | 7/2009 | Kaun |

OTHER PUBLICATIONS

Ronald A. Guidotti et al., Evaluation of the Li(Al)/MNO2 Couple in LiNO3—KNO3 Eutectic Electrolyte for Borehole Applications, Proc, 41st Power Sources Conf., 141 (2004).
J. Douglass Briscoe et al., Lithiated Transition Metal Oxide Cathodes in Molten Nitrate Electrolytes for Lithium Thermal Batteries, SAE Technical Paper 2002-01-3245, 2002.

*Primary Examiner* — Gregg Cantelmo
(74) *Attorney, Agent, or Firm* — Cherskov Flaynik & Gurda, LLC

(57) ABSTRACT

A thin, flexible, porous polymer composite film useful as a separator for a molten-salt thermal battery having a lower temperature electrolyte melt formulation 150-250° C. typical of molten alkyl nitrate/nitrite comprises 5-50 weight percent of electrically non-conductive ceramic comprising a thermoplastic in the range of 50-95 weight percent. The high-surface-area ceramic is comprised of MgO (preferred), $Al_2O_3$, $AlSiO_2$, BN, AlN, or a mixture of two or more of the foregoing; and providing a porous network having a porosity of not less than 30 percent by volume. Likewise, the electrodes can be manufactured with polymer-bonded particulates of porous ceramic such as MgO. Cells for thermal batteries are fabricated in the uncharged state, e.g., Carbon/lithiated metal oxide. Additionally, a polymer-based thermal battery construction can free design from the rigid stacked-pellet battery design. Alternatively, a porous ceramic composite film of MgO coated non-conductive ceramic fibers may be used as a separator.

18 Claims, 5 Drawing Sheets

THERMAL BATTERY WITH POLYMER-BASED CONSTRUCTION

This Utility Patent Application claims the benefits of U.S. Provisional Patent Application No. 61/482,125 filed on May 3, 2011 and U.S. patent application Ser. No. 12/315,210 filed on Dec. 1, 2008, patented as U.S. Pat. No. 8,313,853 on Nov. 20, 2012, the disclosures of which are incorporated herein by reference.

STATEMENT OF GOVERNMENTAL RIGHTS

This invention was made with Government support under contract No. H0006-10-C-7326 awarded by the Missile Defense Agency, MDA. The Government has certain rights in the invention.

FIELD OF THE INVENTION

The present invention relates to thermal batteries and their components, and more particularly, this invention relates to porous polymer composite (PPC) films, polymer binders for powdered ceramics, and ceramic coating of porous polymer film, all for use in thermal batteries.

BACKGROUND OF THE INVENTION

Thermal batteries are the preferred back-up power sources for many weapon and defense systems. This is due to their very long shelf life (about 40 years). Thermal batteries are kept in an essentially frozen state until activated by heating. Within milliseconds of reaching operating temperature, thermal batteries produce very high pulse power outputs. Power generated by such batteries is utilized for guidance, communication, and arming of weapon and defense systems. Accordingly, thermal batteries play a critical role in our national defense.

Quality control is critical in thermal batteries in military systems, given that they are activated (for example by heating) only once to be used instantly, this after being dormant for perhaps 25 years. The reliability of these systems is gauged indirectly on the reliability of like-constructed components.

The prevailing construction and chemistry of a state-of-the-art thermal battery comprises Li-alloy and metal sulfide electrodes, with a lithium halide salt as the electrolyte. Interleaved between the electrodes and residing within the electrolyte are separators. The salt becomes molten upon heating. The separator component of a thermal battery physically separates and ionically couples the anode and the cathode in each cell of the battery. Ideally, a separator should have a relatively high capacity for an electrolyte and have connected porosity for high performance. Added characteristics of importance include dimensional stability and robustness.

Typical batteries comprise a stack of wafers of pelletized powders. Wafer fabrication and battery assembly involve substantial hand labor, partly due to the frangible nature of separators. The wafer pressing operation has received some automation, but battery assembly typically relies on hand stacking of components.

Embodiments of state of the art thermal batteries include Li-alloy (and mainly LiSi alloy) anodes, molten halides as electrolytes and a $FeS_2$ cathode. To obtain temperature and chemical stability, they were built around MgO pressed-powder separators, therefore embodying a ceramic approach to construction. Lower melting salt (e.g. nitrates) applications are based on the ceramic approach to battery construction.

Lower temperature technologies based on Li-ion or aqueous-type of electrochemical cells, such as lead acid, typically utilize polymer separators.

U.S. Pat. No. 5,382,479 Jan. 17, 1995 is an example of the typical stacked-pellet construction for thermal battery. These ceramic based separators require pyrotechnic heating to greater than 350° C. to activate the molten salt electrolyte chemistry.

U.S. Pat. No. 6,544,691, Apr. 8, 2003, discloses lower temperature operation with nitrate molten salts among other organic salts. The claims include traditional chemistry (anode/cathode, e.g. Li-alloy/metal sulfide or metal oxide) and construction with pressed-powders including ceramic separators.

U.S. Pat. No. 4,260,667 Apr. 7, 1981 discloses an electrolyte oxidizer and U.S. Pat. No. 7,629,075 Dec. 9, 2009 discloses chloride free molten nitrates with Li-alloy electrode Shinohara et al., U.S. Pat. No. 6,447,958, Sep. 10, 2002 discloses a battery separator comprising heat resistant nitrogen-containing aromatic polymer and a ceramic powder to include thermoplastic for shut down property.

Patent Appl. US 2007/0100012, May 3, 2007 discloses Production of high porosity membranes with polyvinylidene difluoride, PVDF. Polyolefins are the common material of choice.

US Patent Appl. US 2007/0099080, May 3, 2007 discloses molten electrolyte that contains at least one organic salt for medium temperature operation as an alternative to the lower melting-point nitrate for thermal batteries.

U.S. Pat. No. 7,871,447, Jan. 18, 2011, discloses an automated production of the stacked-pellet thermal battery that is extraordinarily controlled due to fragility of the pressed pellets and to insure reliability.

U.S. Pat. No. 7,807,286, Oct. 5, 2010 discloses production of high porosity membrane of nonwoven polyolefin fiber with a multiplicity of apertures overlaid with ceramic coating of Al, Zr and Si oxides. This membrane is limited to 120° C. operation temperatures with dependence on polymer porosity and with a shutdown feature when temperatures exceed 120° C.

Standard thermal batteries rely on pressed-powder MgO separators which are relatively inexpensive chemically stable, and which can immobilize 65-85 volume percent of electrolyte within the pores of the pressed powder. A significant drawback of MgO separators is the limited structural stability of the material. This limited structural stability relegates MgO separators to relatively thick configurations, of at least about 0.3 to 1.0 millimeters. Any thinner ceramic-based separators are impractical due to the physical strength limitations inherent in MgO pressed-powder materials. A typical MgO powder separator with molten electrolyte is transformed to a paste at thermal cell operating temperatures. These paste separator configurations limit cell structures of thermal batteries to a simple stack of pellets. By comparison, the invented thermal battery enables the construction of a wound assembly design in addition to a stacked pellet assembly, compressed in a planar configuration.

Interest in alternative thermal batteries and separator technologies is ongoing. The trend has been toward development of higher energy and power density. The design approach for this has typically involved producing thinner cells. Thermal batteries are produced from stacked cells consisting of pressed powder wafers comprising layers which are situated in the following repeating order: (a) a heat pellet, (b) a Li negative electrode (anode), (c) a porous separator (e.g., MgO) containing a molten electrolyte salt, and (d) a $FeS_2$ positive electrode (cathode). Each wafer typically is about 0.5 mm (about 20 mils) thick. Battery energy and power density could be improved by using a thinner separator, if suitable materials were available. Improvements tend toward thinner components but generally remain planar, i.e. poker-chip pellets that are stacked to form the battery. This includes not only the electrodes and separators but also the heat pellets (pyrotechnics) that are interleafed to heat, or thermally initiate the battery stack. These thermals are based on molten alkali halide electrolyte and therefore require 400-550° C. operation.

A thinner separator would boost the proportion of active materials (electrolyte) in the battery, and thus boost power output. Unfortunately, MgO powder wafers have limited handling strength, and generally must be at least about 1 mm in thickness for practical use in thermal batteries. Thinner MgO tends to crack or break, thus compromising the integrity of the entire battery. Larger diameter wafers exacerbate the handling problems. Because of this, MgO powder wafers must have a substantial thickness to be of practical use. In addition, volumetric changes of the active electrolyte material tend to distort the electrolyte/separator interface, which leads to cell shorting.

Current thermal battery manufacturing employs uniaxial powder pressing technology to form active cell components. The thickness, diameter, and overall geometry (parts are typically cylindrical) of the wafers are limited by the uniaxial powder pressing process. The thickness obtainable for uniaxially pressed wafers for thermal batteries ranges from approximately 1 mm to about 10 mm. Production of thinner or thicker parts is notably more difficult, and commonly results in low yields, and therefore, higher costs. Thinner wafers require precise, even die loading, while thicker wafers require the use of organic binders to distribute the applied pressure evenly. Similarly, large diameter wafers are difficult to uniaxially press due to increasingly larger processing equipment required to provide the necessary mechanical loads to form the wafers—typically greater than about 10,000 pounds-per-square inch (psi). These limitations preclude many advanced battery designs.

For electrode pellet manufacture, a high tonnage press typically is required to achieve 50 volume percent active electrode materials loading. A portion of the electrolyte salt generally is combined with the electrode material to aid in the formation of suitable cold-pressed pellets. The metal sulfide electrode material, $FeS_2$, is a very hard material and does not compact well on its own. Typically, the pressed electrode uses $FeS_2$ coated with electrolyte salt to facilitate the powder compaction. The resulting cold-pressed pellet generally comprises about 50 volume percent $FeS_2$, about 30 volume percent electrolyte salts, and a void volume of about 20 volume percent. An unpressed powder layer would typically have a void volume of about 50 volume percent. To achieve the desired 50 volume percent active material loading, the high tonnage press must displace about 30 percent of the void volume so as to accommodate the electrolyte salt. This is crucial, in that unpressed electrodes with a 20-30 volume percent loading of electrolyte exhibit poor performance (e.g., low energy density and low power output).

The separator material used in conventional molten salt thermal batteries is pressed from a high-surface area MgO powder. MAGLITE® S or MAGLITE® D (Calgon), and more recently MARINCO® OL (Marine Magnesium Company) magnesium oxide mixed with electrolyte salt, have been the materials of choice for pressed powder separators. Due to limited availability, alternative materials have been investigated, but only the pressed-powder MgO/salt separator has found commercial application. The separator performance is closely related to the surface properties of the MgO particles. Thermal battery production remains costly with fragile materials, expensive facilities, and extreme quality control because they can't be tested, shelved and later activated.

SUMMARY OF THE INVENTION

An object of the present invention is to provide an electrode separator for use in thermal batteries that overcomes many of the disadvantages of the prior art.

Another object of the present invention is to provide a separator for thermal batteries that confers greater weight and fabrication efficiency compared to state of the art separators. A feature of the separator is its relatively thin profile, at between from about 0.3 mils (8 microns) to about 1.2 mils (30 microns), and its flexibility. An advantage of the invented separator is its durability during handling. Another advantage is that the fabrication process utilizing the separator does not require a press, nor does the process need to be conducted in inert atmosphere relative to the components of the battery.

Yet another object of the present invention is to provide a separator for thermal battery electrodes which enable the final battery structure to be tested prior to actual deployment. Features of the invented porous polymer composite films is that they can be readily wetted with molten nitrates at 150-250° C., they exhibit good bending strength, they have flexibility, small pore-size, low density, and tortuosity, Typical polymer based separator breaking strength is at least 1 N/cm and up to 10 N/cm. Flexibility or bending of the PPC separator is at least down to 1 mm radius without damage. An advantage of the invented separators is that they can be performance evaluated, "frozen", and later assembled into thermal (reserve) batteries. Periodic testing can occur by heating, quick performance test and refreezing. By "frozen", freezing or refreezing herein is meant to solidify the electrolyte from the molten state.

Briefly, the invention provides a flexible, porous polymer composite film comprising from about 5 percent to about 50 weight percent of the porous polymer composite film of electrically non-conductive ceramic; and 50 to 95 weight percent of the porous polymer composite film of thermoplastic.

Also provided is a flexible, porous polymer composite film comprising 50 percent to 90 percent by weight of the porous polymer composite film of a polymer (e.g., polyvinylidene fluoride, polyolefin, (polyethylene, polypropylene), polyvinylchloride, polyacrylonitrile, polymethyl methacrylate, polyvinylidene fluoride-hexafluoropropylene copolymer) and 10 percent to 50 percent by weight of the porous polymer composite film of electrically non-conductive porous ceramic; wherein the ceramics comprise MgO, $Al_2O_3$, $AlSiO_2$, BN, AlN, or a mixture of two or more of the foregoing; and the electrically non-conductive porous ceramic interconnects the ceramic providing a porous network having a porosity of not less than 30 percent by volume; the pores of the network containing an alkali metal nitrate electrolyte in an amount of up to 70 percent by volume based on pore volume of the network. In an embodiment of the invention, the ceramic is MgO.

The invention also provides a combination of laminated electrodes and porous separator film and an electrolyte within the porous separator film, the combination comprising layers of powdered cathode material and anode material adhering to a surface of a separator film with an electrolyte therebetween; the separator film comprising 5 percent to 50 percent by weight of electrically non-conductive ceramic and 50 to 95 weight percent of the separator film of a thermoplastic;

wherein the ceramic comprise MgO, $Al_2O_3$, $AlSiO_2$, BN, AlN, or a mixture of two or more of the foregoing and the ceramic interconnects the porous network of having a porosity of not less than 30 percent by volume; the pores of the network containing an alkali metal nitrate electrolyte in an amount of up to 70 percent by volume based on pore volume of the network with the electrodes to form an electrochemical cell.

In another embodiment of the invention, a combination of laminated electrodes and porous separator film are combined with an electrolyte within the porous separator film, the combination comprising layers of powdered cathode material and anode material adhering to a surface of a separator film with an electrolyte therebetween; the separator film comprising 5 percent to 50 percent by weight of the separator film of electrically non-conductive ceramic and from about 50 to about 95 percent by weight of the separator film of a thermoplastic polymer, wherein the electrically non-conductive ceramic comprise MgO, $Al_2O_3$, $AlSiO_2$, BN, AlN, or a mixture of two or more of the foregoing; and the electrically non-conductive ceramic with a porous interconnected network of having a porosity of not less than 30 percent by volume; the pores of the network containing an alkali metal nitrate electrolyte in an amount of up to 70 percent by volume based on pore volume of the network with the electrodes to form an electrochemical cell. In an embodiment of the invention, the cathode material includes one or more compound of Mn, Fe, Co, Cu, or Ni. In an embodiment of the invention, the separator film contains MgO and ceramic fiber, is less than 12 mils (0.30 mm, 300 microns) thick, and includes an electrolyte containing $LiNO_3$ present in an amount in the range of 70 percent to 30 percent by volume of the porous film. In an embodiment of the invention the ceramic has a surface area of between approximately 5 and 30 $m^2/g$. In an embodiment of the invention, the film has a thickness of less than 2 mils. In another embodiment of the invention, the cell contains a lithium-containing anode material and a powdered cathode material separated by a flexible, porous composite film, the film being less than 1.2 mils (0.030 mm, 30.5 microns) in thickness, and including an alkali metal nitrate electrolyte in the pores thereof, in an amount of up to 70 percent by volume.

The invention provides a method of making a flexible, porous polymer composite film, the method comprising depositing a suspension of the magnesium precursor/polymer, introducing an infusible nitrate salt (or nitrate salt solution) into the ceramic/polymer film; drying the nitrate salt to form a dried film; and heating the dried film at a temperature and for a time sufficient to convert the magnesium precursor to magnesium oxide to thereby afford a composite film comprising magnesium oxide having a nitrate salt coating interconnected to form a porous network having a porosity not less than 30 percent by volume. The cell can be heated, electrochemically tested and returned to a charged, "frozen" state.

In an embodiment of the invention, the invention provides a method of making a flexible, porous polymer composite film, comprising depositing a suspension of the ceramic precursor/polymer, introducing a infusible nitrate salt (or nitrate salt solution) into the ceramic/polymer film; drying the nitrate salt to form a dried film; and heating the dried film at a temperature and for a time sufficient to convert the ceramic precursor to ceramic oxide to thereby afford a composite film comprising ceramic having a nitrate coating interconnected to form a porous network having a porosity not less than 30 percent by volume, wherein the cell is heated, electrochemically tested and returned to a charged, solid state. In an embodiment of the invention, a ceramic precursor is a salt of a ceramic material, which upon heating converts into a ceramic material. A ceramic precursor is, for example, magnesium acetate which thermally decomposes to MgO.

In an another embodiment of the invention, the invention provides method of making a thermal battery comprising, providing a first electrode, forming a first suspension of a first ceramic precursor/polymer mixture, depositing the first suspension of the first ceramic precursor/polymer mixture onto the first electrode, drying the first ceramic precursor/polymer mixture, introducing a soluble first nitrate electrolyte onto a first ceramic/polymer mixture, drying/heating the first electrolyte to melt the first electrolyte into the first ceramic precursor/polymer mixture, apply pressure to the first electrolyte and first ceramic precursor/polymer mixture, and cool the first electrolyte and first ceramic precursor/polymer mixture to form a first electrolyte-ceramic precursor/polymer precursor, providing a second electrode and electrolyte to the surface of the first electrolyte and first ceramic precursor/polymer mixture to form a thermal cell. In another embodiment of the invention, the invention provides a method of making a thermal battery further comprising heating the thermal battery to melt the first nitrate electrolyte, applying a voltage to charge the thermal battery cell unit and cooling the thermal battery to solidify the-first nitrate electrolyte to preserve the stored charge. In another embodiment of the invention, the method of making a thermal battery further comprises a reusable heat source. In another embodiment of the invention, the invention provides a method of making a thermal battery, wherein the first electrode is a cathode selected from the group consisting of $FeS_2$, $CoS_2$, $CrO_2$, $LiCoO_2$, $NiS_2$, $MnO_2$, $LiMn_2O_4$, $Ag_2CrO_4$, $K_2Cr_2O_7$, $WO_3$, $PbCrO_2$, $CaCrO_4$, $LiFePO_4$, $LiFePO_4F$ (Tavorite), $LiCo_{1/3}Ni_{1/3}Mn_{1/3}O_2$, $Li_\alpha N$-$i_xMn_yO_2$ and $Li(Li_\alpha Ni_\alpha Mn_y Co_z O_2)$, where $0 \le \alpha \le 1$, $0 \le x \le 1$, $0 \le y \le 1$ and $0 \le z \le 1$ and the first nitrate electrolyte is selected from the group consisting of $LiNO_3$, $KNO_3$, $NaNO_3/NaNO_2$, tetraallylammonium cation. In another embodiment of the invention, the invention provides a method of making a thermal battery wherein the second-electrode is an anode selected from the group consisting of Li, Li(Al), Li(Si), Li(Mg), lithium alloys, Mg, Mg alloys, Ca, Ca alloys, Na, Na alloys, K, K alloys, C, $LiC_6$, $Li_4Ti_5O_{12}$, carbon-coated $Li_{4.4}Si$ and $L_tAl$. Si-based anode is found to be incompatible with nitrate electrolyte unless it can be carbon coated. In another embodiment of the invention, the invention provides a method of making a thermal battery is heated to a temperature from about 150° C. to about 250° C. In another embodiment of the invention, the invention provides a method of making a thermal battery-including a plurality of the thermal battery cells, connected in series or parallel.

In another embodiment of the invention, the invention provides a combination of laminated electrodes and porous separator film are combined including an electrolyte within the porous separator film, the combination comprising layers of powdered cathode material and anode material adhering to a surface of a separator film with an electrolyte therebetween; the separator film comprising 50% to 95% by weight of electrically non-conductive ceramic fibers, a coating of magnesium oxide on the surface of the fibers in an amount in the range of 5% to 50% by weight of the film; wherein the ceramic fibers comprise Al2O3, AlSiO2, BN, AlN, or a mixture of two or more of the foregoing; and the magnesium oxide coating interconnects and binds the ceramic fibers together, providing a porous network of magnesium oxide-coated fibers having a porosity of not less than 50% by volume; the pores of the network containing an alkali metal nitrate electrolyte in an amount of up to 70 percent by volume based on pore volume of the network with the electrodes to form an electrochemical cell. In another embodiment of the invention, the invention provides a combination, wherein the cathode material includes one or more compound of Mn, Fe, Co, Cu, or Ni. In another embodiment of the invention, the invention provides a combination wherein the separator film contains MgO, is less than 12 mils thick, and includes an electrolyte containing $LiNO_3$ present in an amount in the range of 70 percent to 30 percent by volume of the porous film. In another embodiment of the invention, the invention provides a combination wherein the ceramic has a surface area of between approximately 5 and 30 square meters per gram. In another embodiment of the invention, the invention provides a combination, wherein the alkaline metal nitrate is selected from the group consisting of $LiNO_3$, $KNO_3$, $NaNO_3$/ $NaNO_2$, tetraallylammonium cation. In another embodiment of the invention, the invention provides a n electrochemical cell comprising a lithium-containing anode material and a powdered cathode material separated by a flexible, porous composite film, the film being less than 12 mils in thickness, and including an alkali metal nitrate electrolyte in the pores thereof, in an amount of up to 70 percent by volume. In an embodiment of the invention, the film is less than 1.2 mils in thickness. In an embodiment of the invention, the electrochemical cell includes uncharged state electrodes.

Additional advantages, objects and novel feature of the invention will become apparent to those skilled in the art upon examination of the following and by practice of the invention.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1A:
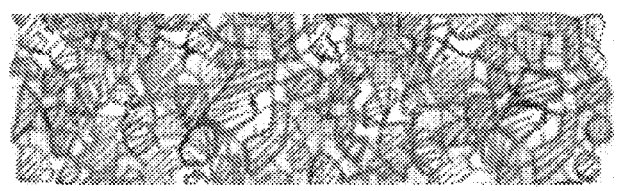
FIGS. 1a and 1b depict in cross-section a porous polymer composite (PPC) comprising high-surface-area ceramic particulate (cross hatched) that are bonded together via thermoplastic ligands to form a structure having 30-80 percent total porosity, (b) depicts the functionality of the high surface area ceramic within the polymer film matrix to impart ionic conductivity through the PPC film.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention relates to thin film articles and methods of making thermal batteries capable of reduced temperature operation. These thermal batteries are used for reserve power purposes.

More specifically, the present invention relates to porous polymer composite (PPC) films useful as thin ceramic containing separators in thermal batteries. The invention also provides polymer binders to generate sheets and films comprising powdered ceramics. The invention further provides methods for producing ceramic coating of porous polymer film. An embodiment of invention relates to thermal batteries based on nitrate electrolyte, and to articles and batteries incorporating the aforementioned PPC films. To this end, a ceramic fiber separator or paper-like separator is developed for advanced thermal batteries. With a degree of flexibility, this separator gets around handling issues of large diameter, thin parts In an embodiment of the present invention, a ceramic fiber separator, or paper-like separator, that is developed for advanced thermal batteries provides incremental improvement to the nitrate thermal battery. The relatively thin Ceramic fiber separator at 6-12 mils (150-300 microns) supports up to 90% of its volume occupied with molten nitrate at 150-250° C. The reduced thickness of the ceramic fiber separator and associated reduced cell impedance can double energy density. With its degree of flexibility, this paper-like separator gets around handling issues of large diameter, thin parts. The toughness of the ceramic fiber separator increases the durability of the conventional stacked component assembly. Ceramic fiber separator can be the foundation of thin electrode manufacture with the nitrate molten-salt electrolyte. As a consequence of the molten nitrate of the present invention, thermal battery operating temperature between 150-225° C. can be significantly lowered versus molten halides for the conventional thermal battery operating at 400-550° C. Lower operating temperature means less insulation, which equates to a more compact structure.

Separator Detail

The present invention provides a very thin, about 0.3-1.2 mils (8-30 micron) thick separator (much thinner than previously constructed separators which were on the order of 250 microns thick). The polymer-based separator provides new ways to design and fabricate thermal batteries, such as use of laminated films and spiral or flat wound construction. The invented separator enables construction of wound cell thermal batteries. Very thin cells generate significant voltage in small packages (short stack height), e.g. 300V in an inch high battery stack. Substitution of the ceramic fiber separator (at 6-12 mils, 150-300 micron) approximately doubles the battery stack height, but less than half the stack height of the pressed pellet approach.

A key advantage to using the invented separator with nitrate molten salt electrolyte is the ability to fabricate thermal batteries with a lithium-based electrochemistry in the uncharged state that is similar to the chemistry of common Li-ion batteries. Most consumer electronics using Li-ion cells use carbon (anode) vs. $LiCoO_2$ (cathode) as fabricated 0.3V. As in FIG. 4, the sealed cell (sealed from ambient environment) is subsequently charged to 3.3 Volts to form $LiC_6$ (anode) vs. delithiated $LiCoO_2$ (cathode). The reduced lithium activity of the uncharged state obviates the need for confining production in a dry atmosphere or inert atmosphere. This fabrication environment is not only a huge cost savings, but the selection of electrode materials expands and the battery construction can be opened to other formats, (other than the stacked pellet battery construction).

Thermal batteries produced via the instant invented protocol are initially heated and charged so as to undergo performance checks and evaluations before installation. Testing temperatures are typical operating temperatures, as such; performance checks are made at between about 160° to 210° C. These thermal check outs can occur for up to 15 minutes, preferably below 15 minutes, and most preferably between about 5 and 10 minutes.

Figure 8:
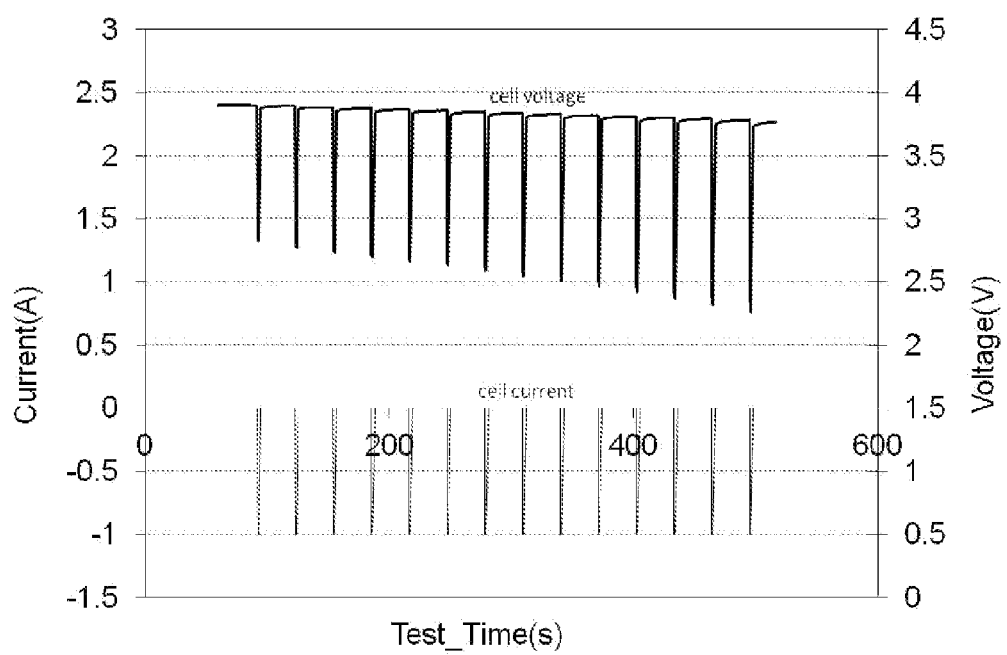
FIG. 8 a Carbon/lithium cobalt oxide (LCO) cell including molten nitrate electrolyte at 180° C. that has been charged and then frozen at room temperature. As in the figure, upon reheating the cell (as in thermal battery) is capable of pulsed discharging from an open circuit voltage of 3.8 V.

This intermittent use/testing of thermal batteries, changes the way thermal batteries are produced and applied to critical systems. Specifically, the application of the invented PPC film separator with reduced temperature electrolyte enables the thermal battery designer/fabricator to break away from the conventional stacked-cell thermal battery design requiring pyrotechnic initiation. The instant thermal battery can operate without pyrotechnic initiation, subsequently stored in its fully-charged state, to then be pyrotechnically initiated as thermal battery within a power system. FIG. 8 exhibits the durability of the nitrate cells with the improved separator to heated, charged, and frozen. After benign storage (zero volts), the cell is reheated to deliver power/energy, usually as discharge pulses.

Reduced thermal mass and lower operating temperature as a consequence of use of the invented separator enables alternative methods of battery heating (or initiation) that are potentially safer and new applications. Activation (or initiation) of thermal batteries depends on the rapid heating of the battery to melt the salt electrolyte. A significant part of the thermal mass is the heat of fusion (solid to ionic liquid) for the salt electrolyte 100-200 J/g, which is 10-100 times that of the heat capacity (0.5-1.0 J/g ° K) for the cell materials. Reducing the separator thickness about $\frac{1}{10}$ (25 micron from 500 micron or more) and the associated $\frac{1}{20}$ electrolyte salt mass reduces the thermal input necessary to activate the battery. Additionally, the thermal conductivity of the Cu and Al foil current collectors used with the nitrate electrolyte have approximately 10 fold greater thermal conductivity than the graphite and steel current collector of the common halide electrolytes that are operated at 350-550° C. vs. 140-210° C. for the nitrates. Faster heat transfer enables faster and more uniform battery activation.

Figure 2:
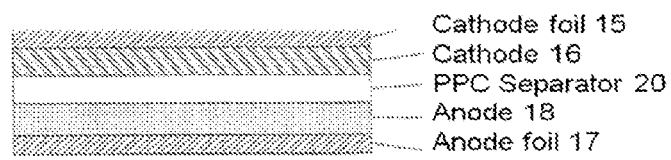
FIG. 2 is a cross-sectional view of a porous polymer composite (PPC) film along with a tapecast lithium metal oxide/ electrolyte cathode and tapecast carbon anode, in accordance with features of the present invention.

An embodiment of the invention comprises foil coated electrodes with thin film separator whose lower thermal mass and increased thermal conductivity (which is enabled by tightly spaced foils. FIG. 2 shows the configuration of foil-backed electrode laminates and the thin film separator. The robust battery of electrode foils incorporating the thin film PPC separator can be compressed to between approximately 5-25 lbs/in$^2$ pressure. Some embodiments enable compression to less than 10 lbs/in$^2$ pressure. Other embodiments of thermal batteries using the invented PPC films enable compression to more than 10 lbs/in$^2$ pressure. In another embodiment of the invention, the PPC films enable compression to levels higher than 12 lbs/in$^2$ pressure. In yet another embodiment of the invention, the PPC films enable compression to levels from about 15 lbs/in$^2$ pressure to about 25 lbs/in$^2$ pressure. These tight compressions provide a means for heating the battery via thermal conductance, wherein the heat source is situated at the periphery of the battery, instead of requiring the heating source (heat pellets) being intercalated or otherwise leafed into the stacked cell battery.

In one embodiment, the invented PPC separator has a structure comprised of a porous polymeric thin film. An exemplary polymeric film of 30-80 percent porosity has pore size in the range of from about 0.05 to about 0.25 microns in diameter. Such films are organic thermoplastic compounds selected from the group consisting of polyvinylidene fluoride, polyolefin, (polyethylene, polypropylene), polyvinylchloride, polyacrylonitrile, polymethyl methacrylate, polyvinylidene fluoride-hexafluoropropylene copolymer, ethylene-acrylic acid copolymer, ethylene-styrene copolymer, styrene-butadiene copolymer, styrene-isoprene copolymer, polydiene, polyalkane, polyacrylic, polyvinyl ether, polyvinyl alcohol, polyacetal, polyvinyl ketone, polyvinyl halide, polyvinyl nitril, polyvinyl ester, polystyrene, polyphenylene, polyoxide, polycarbonate, polyester, polyanhydride, polyurethane, polysulfonate, polysulfide, polysulfone, polyamide, and combinations thereof.

An embodiment of this invention is a separator suitable for use in a thermal battery that is a flexible, porous polymer composite film, in which the film comprises about 5 percent to 50 percent by weight of electrically non-conductive ceramic combined with a polymer in an amount in the range of 50 percent to 95 percent by weight. The high surface area ceramics having 5-25 square meter per gram can comprise MgO, $Al_2O_3$, $AlSiO_2$, BN, AlN, or a mixture of two or more of the foregoing. In an embodiment of the invention, the high surface area ceramics comprise MgO, $AlSiO_2$, or a combination thereof (e.g., 50 percent to 95 percent by weight MgO and 5 percent to 50 percent by weight $AlSiO_2$). In an embodiment of the invention, the high surface area ceramics can comprise MgO, $Al_2O_3$, $AlSiO_2$ or a combination thereof. The overall film porosity is 30-80 volume percent. PPC can be formed by tapecasting porous ceramic particulate in a polymeric solution of thermoplastic. The tapecasting polymers used as binder for functional particulate are commonly polyvinylidene difluoride, PVDF dissolved in NMP, 1-methyl 2-pyrrolidinone. Common binder comprises at least one fluoropolymer, said at least one fluoropolymer containing at least one functional group selected from the group consisting of hydroxyls, thiols, carbonyls, carboxylic acids, carbonates, sulfonyls, sulfonic acids, sulfonates, phosphoric acids, boric acids, esters, amines, amides, nitriles, epoxies and isocyanates. Fluoropolymer binder is a homopolymer or a copolymer prepared from at least one monomer selected from the group consisting of vinyl fluoride, vinylidene fluoride, tetrafluoroethylene, trifluoroethylene, chlorotrifluoroethylene, fluorinated vinyl ethers, fluorinated alkyl acrylates/methacrylates, and perfluoroolefins having 3-10 carbon atoms, perfluoro C1-C8 alkyl ethylenes and fluorinated dioxoles. An embodiment of the PPC film consists of ceramic and polymer. No additional materials such as aggregate, wax, carbon particles such as fibers, or inert materials are added. This will assure that the pores (defining the interconnections) which are initially formed by the interaction with the ceramic and polymer remain intact during the entire thermal cycling of the battery. As such, polymer is supplied as a neat, unblended constituent. The porosity of PPC (to absorb molten nitrate electrolyte) depends upon the porosity of the ceramic and its interconnections.

In an embodiment of the invention, the ceramic, magnesium oxide, is present at about 10 to 50 percent by weight, for example about 45 weight percent. Also in this embodiment, the ceramic may contain from about 5 to about 50 percent $AlSiO_2$. Also in this embodiment, the polymer comprises between about 50 and 55 weight percent of the film. The porous magnesium oxide/polymer composite defines an interconnected porous network having a porosity of not less than about 30 percent by volume. In an embodiment of the invention, the network has a porosity between about 30 and about 80 percent. In another embodiment of the invention, the network has a porosity of about 65 percent by volume. The high porosities seen with the PPC film are due to the high surface area ceramic particles utilized in this embodiment, said surface areas as high as about 20-30 $m^2/g$.

Preferably, the ceramic particulate ranges in diameter of about 5 microns or less. In an embodiment of the invention, the ceramic particulate ranges in diameter from between about 0.5 and 4.0 microns. In an embodiment of the invention, the film has a thickness of less than about 1.2 mils (0.03 mm), e.g., 0.5-1.0 mils (about 0.013 to 0.025 mm or 13 microns to about 25 microns). Preferably, the film includes pores up to about 0.2 microns in average diameter. A bimodal pore distribution is desirable with 25 percent of pores at about 0.5 micron and 25 percent at about 2 micron. The porous polymer composite (PPC) films of the present invention are manufactured without the use of a high-pressure hydraulic press, and can be prepared in precursor sheets that can be readily cut to any desired shape or size up to about 250 mm diameter. The PPC can also be produced in a continuous length (meters long) that enables spiral or flat wound cell configurations. The PPC films exhibit surprising flexibility and handling strength with the nitrate salt infiltrated.

In another embodiment, the present invention provides a flexible porous polymer composite PPC film suitable for use in a thermal battery, the PPC film comprising about 5 percent to 50 percent by weight of electrically non-conductive ceramic magnesium oxide wherein the high-surface area (5-25 square meters per gram) magnesium oxide (porous particulate) enables porosity interconnects of not less than about 30 percent by volume. "Porosity interconnects" is to be construed here in as the "through" or interconnected porosity which enables ions to pass from one side of the separator thickness, through the porous ceramic particles, and finally to the other side of the separator, as in FIG. 1 (b). The pores, defined by interspersed ceramic material extend substantially completely through the membrane, in a transverse direction such that the longitudinal axis of the pores are at an angle to, and in some instances generally perpendicular to, the plane formed by the membrane. The pores are adapted to contain, encapsulate or otherwise isolate an alkali metal nitrate electrolyte in an amount of up to about 70 percent by volume based on pore volume of the network.

As a result of the electrolyte confined to the ceramic material, substantially the entire electrolyte resides within the pores of the separator, with no electrolyte residing on the nonporous regions of the separator. This is because the surface area of the high-surface-area ceramic particles is magnitudes greater at 5-25 $meter^2/gram$ than that of the polymer which defines the network and connecting regions between the pores. FIG. 1b provides a schematic of the PPC film 12 wherein porous ceramic material 14 is homogeneously interspersed within polymer 13. The dashed lines represent ion flow through the ceramic-defined pores.

The porous ceramic can be MgO, $Al_2O_3$, $AlSiO_2$, BN, AlN, and a combination thereof. In an embodiment of the invention, the ceramic comprises MgO, $Al_2O_3$, $AlSiO_2$, or a combination thereof). The alkali metal nitrate comprises a lithium nitrate/nitrite salt and a mixture of another alkali metal nitrate (e.g., a mixture of $LiNO_3$, $LiNO_2$, $NaNO_3$ and $KNO_3$). In an embodiment of the invention, the alkali metal nitrate comprises a mixture of $LiNO_3$, $LiNO_2$, $KNO_3$, organic additive, and combinations thereof.

In another embodiment, the present invention provides a laminated electrode and porous separator film combination suitable for use in thermal batteries. As in FIG. 3, the combination includes an electrolyte within a PPC film of the invention as a separator, and layer of powdered cathode material adhering to a surface of the PPC film with additional electrolyte there between to bind the cathode and the separator. The PPC film without the presence of electrolyte comprises 10 percent to 50 percent by weight of electrically non-conductive ceramic combined with polymer in an amount in the range of 50 percent to 90 percent by weight. The ceramic can be MgO, $Al_2O_3$, $AlSiO_2$, BN, AlN, or a mixture of two or more of the foregoing. As in the other embodiments of the invention, the polymer provides a means for establishing fluid communication between the ceramic pores by establishing a porous network of magnesium oxide particulate, whereby the ceramic substrate has a porosity of not less than 30 percent by volume (typically 50 to 80 volume percent). In this embodiment, the pores of the network contain an alkali metal nitrate electrolyte in an amount of up to 75 percent by volume based on the pore volume of the network. The cathode material can include one or more compounds containing Mn, Fe, Co, Cu, Ni, and combinations thereof. In an embodiment of the invention, the separator film includes an electrolyte containing $LiNO_3$ present in an amount in the range of about 40 percent to 75 percent by volume of the porous film.

Another embodiment of the present invention is a thermal battery cell comprising a lithium-containing anode material and a powdered cathode material separated by a flexible, porous composite film of the present invention, as described herein. The ceramic fiber separator of U.S. Pat. No. 8,313,853 improves on the state of the art, while the PPC described herein takes low thermal mass and higher energy density for nitrate thermal the next step in development. Preferably, the battery comprises a plurality of the cells connected in series or parallel.

In yet another embodiment, the present invention provides a method of making flexible, tapecastings of electrode and laminate with the PPC separator film. This arrangement can facilitate many battery design and form factors to aid system designers.

Film Fabrication Detail

Production of the PPC, porous polymer composite film comprises the steps of (a) depositing ceramic particles onto a substrate from a suspension; (b) drying the layer to form a dried, paper-like film; and (c) heating the dried film at a temperature and for a time sufficient to develop the polymer interconnects with the ceramic particles to form a porous network having a porosity not less than about 30 percent by volume of the film.

The PPC films are flexible and have surprising and exceptional handling strength suitable for thermal battery use, at thicknesses in the range of about 0.3 to about 1.2 mils (0.008 to 0.03 mm, 8 to 30 microns) with a preferred thickness of 0.8 mil (0.02 mm, 20 microns), which is significantly thinner than the practical limit for MgO pressed-powder films typically used as thermal battery separator components. The polymer layer with ceramic particles can be deposited or can be cast onto an electrode substrate, such as a $MnO_2$/kynar layer on Al foil substrate.

In an embodiment of the invention, a thin PPC film provides a substitute to the conventional pressed MgO powder separator which is typically used in the manufacture of thermal batteries. The resulting structure defines a thickness of about 0.3 to 1.2 mils while still maintaining a surprisingly high degree of strength and flexibility. Typical breaking strength of the invented separator is at least about 1 N/cm and up to 10 N/cm. Flexibility or bending of the PPC separator is at least down to about 1 mm radius without damage. The thinner PPC film results in a significantly higher power (higher voltage and current) when used as a separator in a thermal battery, allowing a greater portion of the battery height to be utilized for increasing the number of cells (and thus voltage) in a battery of a given size. In addition, the thinner separator results in less battery volume and thermal mass being inactive (i.e., non-electrolyte or electrode material), resulting in significantly higher battery energy per unit volume. Pulse power may increase by 50 percent using the PPC films of the invention as the separator component. Higher energy/power density is a dominant theme in thermal battery development today.

Cell Fabrication with PPC and Ceramic Fiber Separator

The PPC films of the invention, when used as a separator for a thermal battery, have chemical stability to Li activity and wettability to molten nitrate electrolytes. In addition, the PPC films have excellent handling characteristics (flexure strength) and durability in molten salt. The electrolyte can be heated to molten state, electrochemically operated to effectuate initial charge, and then frozen to put the battery into a dormant state. The invented thin PPC films withstand distortion from the volume changes during heat/cool and electrochemical cell charge/discharge much better than conventional pressed-powder MgO separators. This is because the structural stability of polymer interconnect porous ceramic holds the molten nitrate electrolyte in place.

In an embodiment of the invention, a process for making a thermal battery is presented. The processes comprises a method of making a thermal battery comprising, providing a first electrode, forming a first suspension of a first ceramic precursor/polymer mixture, depositing the first suspension of the first ceramic precursor/polymer mixture onto the first electrode, drying the first ceramic precursor/polymer mixture, introducing infusible nitrate electrolyte (or nitrate salt solution) onto a first ceramic/polymer mixture, drying/heating the first electrolyte to melt the first electrolyte into the first ceramic precursor/polymer mixture, apply pressure to the first electrolyte and first ceramic precursor/polymer mixture, and cool the first electrolyte and first ceramic precursor/polymer mixture to form a first electrolyte-ceramic precursor/polymer precursor, providing a second electrode and electrolyte to the surface of the first electrolyte and first ceramic precursor/polymer mixture to form a thermal cell.

In an embodiment of the invention, the process of making a thermal battery further comprising heating the thermal battery cell unit to melt the nitrate electrolyte, applying a charge the thermal battery and cooling the thermal battery to solidify the nitrate electrolyte to preserve the stored charge. In an embodiment of the invention, a reusable heat source is included with the packaging of the thermal battery.

In an embodiment of the invention to form a thermal battery with PPC film separator, nitrate/nitrite salts are the dominant electrolyte of the invention, $LiNO_3$, $KNO_3$, $NaNO_3$,/$NaNO_2$. Additions to the Nitrate/nitrite salts may include organic salt or salts of the electrolyte, such as tetraalkylammonium cation.

Primary materials for the anode include, but are not limited to, Li, $LiC_6$Li(Al), carbon-coated Li(Si), Li(Mg), other lithium alloys, Mg, Mg alloys, Ca, Ca alloys, Na, Na alloys, K, or K alloys. The uncharged electrode versions are the Li absorbing, intercalating, alloy formers: carbon/graphite, Al, carbon-coated Si, titanate. In an embodiment the anode is formed from of $Li_4Ti_5O_{12}$ (Titanate), $Li_{4.4}Si$ and LiAl. Naked, uncoated Si or Li—Si has a compatibility problem with nitrate electrolyte.

In an embodiment of the invention, materials for the cathode include, but are not limited to, $FeS_2$, $CoS_2$, $CrO_2$, $LiCoO_2$, NiS2, $MnO_2$, $LiMn_2O_4$, $Ag_2CrO_4$, $K_2Cr_2O_7$, $WO_3$, $PbCrO_2$ and $CaCrO_4$.

In another embodiment of the invention, materials for the cathode include, but are not limited to $LiFePO_4$, $LiFePO_4F$ (Tavorite), $LiCo_{1/3}Ni_{1/3}Mn_{1/3}O_2$ and $Li(Li_\alpha Ni_x Mn_y Co_z O_2)$, where $0 \le \alpha \le 1$, $0 \le x \le 1$, $0 \le y \le 1$, $0 \le z \le 1$ and $x+y+z \le 1$ PPC films provide a foundation for a new, more-economical method of manufacturing thermal batteries. The structural stability of PPC films in molten salt permit the electrode material to be applied to the film in a continuous process, producing a laminate of electrode and separator such that the electrode is integrally molded with the separator. The ability to utilize larger diameter separator parts and also form spiral or flat wound cells, due to the flexibility and strength of the PPC films, enables new designs for high power thermal batteries. The ability of PPC films of the invention to increase battery power and energy density has been demonstrated.

In some preferred embodiments, the ceramics are present in the PPC film at a concentration in the range of about 1 percent to about 50 percent by weight, with polymer being present in the range of about 99 percent to about 50 percent by weight.

Advantageously, the PPC films of the present invention allow for an improved, continuous manufacturing method for producing thermal battery cells in which a robust electrode of about 40-60 percent active material is produced without the use of a high tonnage hydraulic press. Rather, a thermal process integrates a PPC film separator with a bed of electrode material particles (e.g. $MnO_2$) to produce a separator/electrode combination. The PPC film separator enables electrolyte to infiltrate the film and the metal oxide electrode particle-bed to form a unitary laminated structure having an electrode layer and a separator layer bound together with the electrolyte and affording a desirable electrolyte density of about 50 volume percent in the electrode layer. The structural integrity of the PPC film provides support for the structure, and as the electrolyte salt melts, the porosity of the PCC film regulates the flow of the salt over to the electrode powder bed to keep the electrode material from fluidizing, which is undesirable. This enhanced durability allows the electrode to be assembled in the uncharged-state with low Li-activity constituents. Then the cells are heated, electrochemically charged, frozen and subsequently operated as a thermal battery.

The PPC films of the invention have high porosity (typically 50 to 70 volume percent) to hold molten nitrate containing electrolyte compared to conventional MgO-type separator materials commonly used in thermal batteries. Yet surprisingly, even films as thin as 0.3 mils (0.008 mmm, 8 microns) in thickness retain paper-like structural integrity and flexibility with frozen or liquid electrolyte. These superior handling characteristics make the PPC films of the invention particularly useful in thermal battery applications where very thin films are desirable, but heretofore expensive due to the typically friable nature of conventional separators.

The present invention provides flexible PPC films from about 0.3 mils (0.008 mm, 8 microns) to about 1.2 mil (0.03 mm, 30 microns) thickness, which is a significant improvement over the present thinnest limits of 12 mil (0.30 mm, 300 microns) for cell pressed wafers at 25 mm diameter or larger. Because they are also supplied in the form of flexible sheets, the flexible, porous polymer composite films of the invention offer cost saving options in final assembly operations of thermal batteries. The cost of conventional thin-cell thermal batteries is inflated by the poor handling characteristics of the wafer-thin components. A thirty percent parts-loss rate is presently typical. Even at the conventional electrode thicknesses, the thermal batteries can benefit from using the PPC films of the present invention as the separator component, as well as the ceramic fiber separator of U.S. Pat. No. 8,313,853 of 6-12 mils (150-300 micron). The fragility of conventional wafer pellets has required expensive hand assembly. The durability of the films of this invention (e.g., the bendable nature of the films and the ability to pass a "drop" test) permits automated, faster assembly. Notwithstanding, cells with PPC can be performance evaluated, "frozen", and later assembled into thermal (reserve) batteries. Reduction of human error from the assembly process improves quality control, thereby further increasing the profitability for thin-cell thermal batteries. In addition, the PPC films of the invention can be readily wetted with molten nitrates, exhibit good bending strength, flexibility, small pore-size, low density, and tortuosity, which are highly desirable features or properties for an improved separator in thin-cell, high-power thermal batteries.

Additionally, the PPC films of this invention, when used as separators in a thermal battery cell, have the chemical and physical properties necessary to meet the goal of high current density at high power for future thermal battery applications (i.e., 50-70 percent open volume for high electrolyte content, and the chemical stability to provide resistance to Li corrosion). Unlike pressed-powder MgO separators, full-size 3.66 inch diameter PPC film separators pass the "drop test", and display surprising physical flexibility even after electrolyte filling. The PPC films of the invention can reduce cell thickness and weight, allowing for approximately 300-500 percent more cells per unit of height for a thermal battery utilizing PPC film separators compared to a battery using pressed-powder MgO separators.

For illustration purposes, the invention is described in connection with nitrate electrolyte in a thermal battery. A preferred PPC film separator used to physically and electrically isolate oppositely charged electrodes of the battery comprises about 5/95 to about 50/50 weight ratio of ceramic/polymer. A PPC film of the invention comprises or consists of resilient ceramic, e.g., magnesium oxide, and polymer e.g., kynar, formed into a film of about 0.3 to 1.2 mil thickness. The PPC film can accommodate a loading of at least 30 volume percent of electrolyte to impart high ionic conductivity.

Film Production Detail

A preferred PPC film comprises 70 percent porosity to hold molten nitrate electrolyte at 130-250° C., preferably 160-200° C., most preferably 170-190° C., that is comprised of 50/50 percent porous-ceramic/polymer network of polymer holding ceramic particulate is fabricated by spreading a controlled thickness a polymeric solution with the ceramic particulate and subsequently driving off solvent to impart a PPC film with a porous network.

Non-limiting examples of other methods useful for forming ceramic and polymer into a layer for use in producing PPC films of this invention include:

1. Infiltration of porous ceramic particles or ceramic precursor from a fluidized bath onto a porous polymer film, e.g., using a vacuum roller.
2. Spraying a suspension of porous ceramic particles in a polymeric solution onto a belt followed by heat treatment to remove the solvent;
3. Slip casting a suspension of porous ceramic and polymer in gelatinous medium onto a belt or other substrate; and followed by heat treatment to remove the solvent/precursors;
4. Blowing an air dispersion of ceramic/polymer particles onto a belt followed by heat treatment.
5. Slip casting of a slurry or suspension of porous ceramic/polymer onto a substrate such as an electrode film is a preferred method for preparing a PPC film In one embodiment of the invention, porous polymer composite films PPC for use with the invention can be fabricated from, but not limited to polyvinylidene fluoride, polyolefin, (polyethylene, polypropylene), polyvinylchloride, polyacrylonitrile, polymethyl methacrylate, polyvinylidene fluoride-hexafluoropropylene copolymer.

Examples of Types of Electrodes with Polymer Bonding:

The electrode/polymer separator combination may be fabricated and stored in a charged or uncharged state. Examples of electrodes that are typically stored in a charged-state are LiAl/$FeS_2$, LiAl/$CoS_2$, Ca/$CrO_2$, Li(C)/$CoO_2$, carbon coated LiSi/$NiS_2$, LiAl/$MnO_2$. The electrode/polymer units must be stored in a dry room having a relative humidity (RH) of less than 3% (RH<3%) to avoid side reactions of the electrolyte material with condensed moisture in the atmosphere or discharge of the cell due to moisture induced conduction. Alternatively, examples of electrode/polymer separator combinations that are fabricated and stored in an uncharged-state include but are not limited to Al/$LiCoO_2$, Al/$LiNiS_2$, C/$LiMnNiCoO_x$, C/$LiMn_2O_4$. Since the electrode/polymer combination are maintained in an uncharged state, the electrode/polymer combination can fabricated under normal conditions, thereby avoiding the process and handling requirements associated with dry room manufacturing.

Cell Fabrication with Porous Polymer Composite Films

Figure 1B:
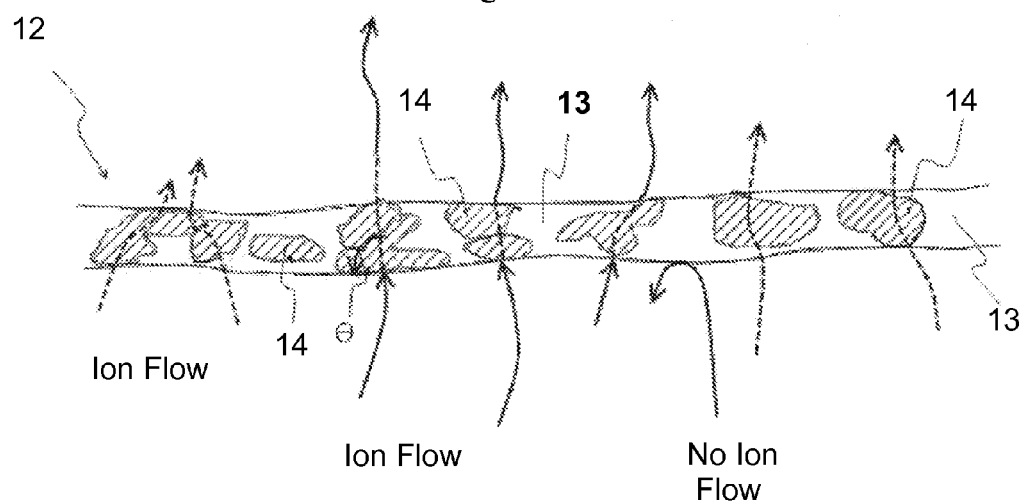

The structural stability of PPC films, FIG. 1a, in the presence of molten nitrate salt provides the basis for a significantly improved method for thermal cell manufacture. In this method of thermal battery manufacture, the PPC film provides a means to immobilize a relatively small amount of molten nitrate electrolyte to carry out the electrochemistry in proximity with the thin film porous electrodes. In particular, common electrodes for thermal batteries are simple particle beds that are infiltrated with molten salt electrolyte at 20-40 volume percent. Too much electrolyte undesirably tends to fluidize the electrode wafer which leads to destruction of its packing density (electrical conductivity) and physical dimension.

The PPC film of the invention can be used in at least three variations of thermal battery cell manufacture, which results provide a PPC film/metal-oxide electrode laminate. The laminate significantly enhances the handling strength of a separator/electrode combination, and also helps to ensure proper components mating and flatness for stacking the cells, inasmuch as the non-rigid PPC film enables flexibility of the entire construct. Typically, the form of the metal oxide electrode will dictate the fabrication procedure to be used.

PPC film with conventional metal-oxide electrode typically is a pressed-powder bed of metal oxides and an electrolyte salt. The thermal process enables the electrolyte to infiltrate the metal oxide particle-bed matrices and retain the initial desired particle-bed density of 50 volume percent with the powdered electrode bed with electrolyte salt as a coating on the PPC.

The laminated PPC film/cathode 30 is immediately available for assembly of a thermal battery (e.g., by stacking with an anode, a heat pellet and a current-collector sheet) infiltrating the PPC and prepared cathode film with an aqueous solution of electrolyte salt. Drying the laid up films electrolyte forms the two layer laminate. Alternatively, the PPC film can be kynar-bonded ceramic particles that are applied to either metal oxide or carbon with foil substrate that is subsequently infiltrated with electrolyte salt.

The solidified electrolyte salt along with the high modulus of rupture (MOR) of the PPC film of the invention unitizes the separator (PPC film) and electrode layers for superior handling. The laminated PPC film/cathode combination 30 is immediately available for assembly of a thermal battery, as described above. These "film" based cells can be easily flexed. Preferably, these films are adapted to be incorporated in spiral or flat wound-type, cylindrical cells with non-laminated PPC/electrode that are subsequently infiltrated with electrolyte salt. The resulting laminated PPC film/electrode layer takes on like properties for handling strength.

Under normal discharge mode for a thermal battery typical positive electrode material (cathode) and negative electrode (anode) material, with Average potential difference, Specific capacity and specific energy are shown in Tables 1 (Positive or cathode) and Table 2 (negative or anode).

TABLE 1

Positive Electrode Materials and Properties.
Positive electrodes

| Electrode material | Average potential difference | Specific capacity | Specific energy |
|---|---|---|---|
| $LiCoO_2$ | 3.7 V | 140 mA · h/g | 0.518 kWh/kg |
| $LiMn_2O_4$ | 4.0 V | 100 mA · h/g | 0.400 kW · h/kg |
| $LiNiO_2$ | 3.5 V | 180 mA · h/g | 0.630 kW · h/kg |
| $LiFePO_4$ | 3.3 V | 150 mA · h/g | 0.495 kW · h/kg |
| $Li_2FePO_4F$ | 3.6 V | 115 mA · h/g | 0.414 kW · h/kg |
| $LiC_{1/3}Ni_{1/3}Mn_{1/3}O_2$ | 3.6 V | 160 mA · h/g | 0.576 kW · h/kg |
| $Li(Li_aNi_xMn_yCo_z)O_2$ | 4.2 V | 220 mA · h/g | 0.920 kW · h/kg |

TABLE 2

Negative Electrode Materials and Properties.
Negative electrodes

| Electrode material | Average potential difference | Specific capacity | Specific energy |
|---|---|---|---|
| Graphite ($LiC_6$) | 0.1-0.2 V | 372 mA · h/g | 0.0372-0.0744 kWh/kg |
| Hard Carbon $LiC_6$ | 0.1-0.2 V | 372 mA · h/g | 0.0372-0.0744 kW · h/kg |
| Titanate ($Li_4Ti_5O_{12}$) | 1-2 V | 160 mA · h/g | 0.16-0.32 kW · h/kg |
| Si carbon coated ($Li_{4.4}Si$) | 0.5-1 V | 4212 mA · h/g | 2.106-4.212 kW · h/kg |
| Al (LiAl) | 0.3-0.5 V | 1600 mA · h/g | 0.7-1.4 kW · h/kg |

The following examples are provided to illustrate certain aspects of the present invention and are not to be interpreted as limiting the invention in any way.

EXAMPLE 1

Production of a Polymer Film for Thermal Battery

A polymer film is prepared by mixing MgO powder in a solution of 20 wt percent PVdF (Kynar) and 80 wt percent NMP. It is tapecast at a 6 mil doctor blade gap. The film drying is done by heating at 100° C. in flowing air at about 75-100° C. After drying about 0.5 hours, the resulting polymer/ceramic film can be peeled from the substrate film. Pieces of PPC film are cut to a desired size using a hand tool, such as an EXACTO® knife, or a die to a predetermined form, such as a 1.05 inch diameter disk. An embodiment of the film has about a 50/50 weight ratio of MgO to polymer as in FIG. 1a and 75 percent total porosity.

Electrolyte is infiltrated into the PCC film (75 percent porosity) or similarly with the ceramic fiber separator (90 percent porosity) by placing a weighed amount of nitrate electrolyte powder onto the separator film, and placing it onto a hot plate just long enough to melt the electrolyte. In an embodiment a temperature for melting the nitrate electrolyte is from about of the invention 150° C. to about 250° C. In another embodiment of the invention the temperature for melting the electrolyte is from about 130° C.-to 210° C. The electrolyte-infiltrated piece is then cooled under weighted pressure. For example, the chill-block (e.g. an Al plate) is placed onto the infiltrated piece and cooled under this weight to solidify the electrolyte. This electrolyte-filled PCC film can be used as a separator in a thermal battery cell by stacking pressed-pellets of a Li—Al alloy/electrolyte wafer and a $CoS_2$/electrolyte wafer on either side of the PPC film to form a cell.

EXAMPLE 2

Production of PPC from a Polymer Film for Thermal Battery

A PPC film starts with about a 65 percent porous polyolefin film approximately 25 micron thick and is infiltrated with a solution of ceramic precursor, such as Magnesium acetate in an amount of about 0.2-0.5 g/cc in $H_2O$/Isopropyl alcohol of about 50/50 volume percent. The solvent is dried for about 1 hour to deposit the Magnesium-acetate within the porous polyolefin film at exemplary temperatures of between approximately 120° C.-200° C. Further heating, vacuum drying, and infiltration of the nitrate salt electrolyte, result in coating and deposit of MgO porous ceramic with the polyolefin film. The resulting PPC film 12 has a thickness of less than about 1.2 mils (generally 0.3-1.2, preferably 0.8-1.1 mils). The nitrate electrolyte can be infiltrated as above by melting a prescribed amount into the PPC. Alternatively, an aqueous solution of the electrolyte salt (typically lithium nitrate containing) can wet the PPC and subsequently vacuum dried at 130-210° C. Unlike the melt addition of the electrolyte salt, the aqueous electrolyte salt infiltration can be done by wetting a strip of PPC, winding the wetted PPC into a roll for production supply, and vacuum drying the roll at 100-120° C.

EXAMPLE 3

PPC Film Laminated with Pressed Electrode Pellet

Figure 3:
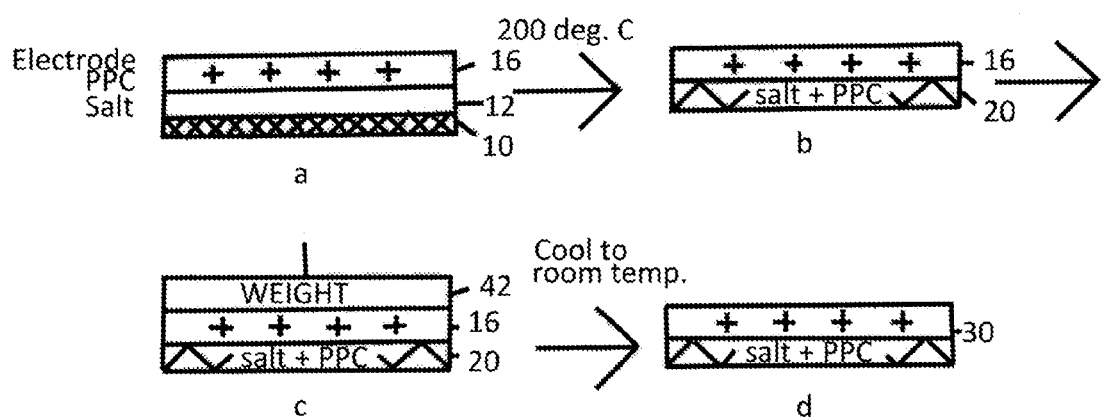
FIG. 3a-d are a cross-sectional views, illustrating the process for making a laminate of a porous polymer composite (PPC) film along with a pressed-powder $FeS_2$/electrolyte electrode; the conveyor belt (a) process for making a laminate of a PPC film along with a $FeS_2$ particle-bed, which after electrolyte addition becomes an electrode (b) after heating to 200° C. salt and PPC combine, (c) press under weight and (d) cooling to room temperature.

The PPC film 12 has a thickness of less than about 1.2 mils (generally 0.3-1.2, preferably 0.8-1.1 mils), and has far superior handling characteristics compared to a conventional MgO separator. A cut piece of the PPC film 12 is then stacked with a MnO$_2$/electrolyte pressed-pellet electrode 16 as shown in FIG. 3.

Electrolyte 10 is infiltrated into the PPC film by placing 0.28 grams of electrolyte powder (an equimolar (i.e., 1:1 molar) blend of LiNO$_3$, and KNO$_3$) under the PPC film, 12 and placing PPC film/electrode stack into at exemplary temperatures of 160-210° C. inert gas furnace well (or hot plate) just long enough to melt the electrolyte into the PPC film. The electrolyte-infiltrated PCC film/electrode combination 30 is then placed onto chill-block (e.g. an Al plate) and cooled under a weight to solidify the electrolyte, laminate the PPC film to the electrode via the solidified electrolyte. The resulting electrolyte-to-separator weight ratio is about 1:1. This electrolyte-filled PPC film/MnO$_2$ electrode 30 is then stacked with a Li-alloy/electrolyte pressed pellet wafer to form a thermal cell.

EXAMPLE 4

PPC Film Laminated with Tapecast Electrode in the Uncharged State

Figure 4:
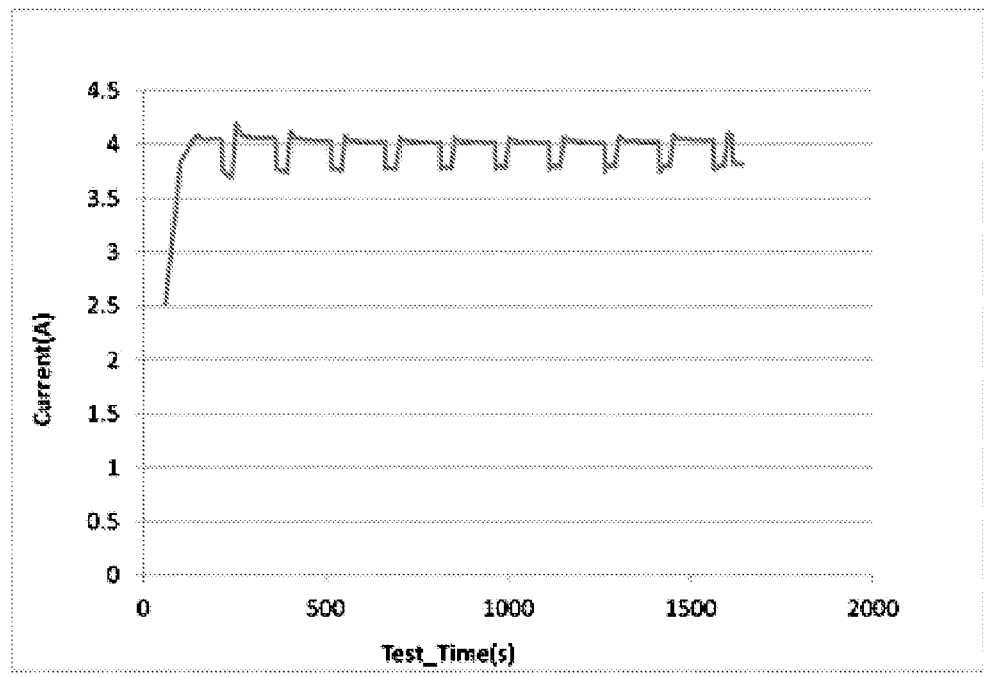
FIG. 4 is a cell voltage/time plot of an initial charge of a Carbon/lithium cobalt oxide (LCO) cell including molten nitrate electrolyte at 180° C. Initial charge of carbon/LCO (lithium-cobalt-oxide) to 3.8 volts open circuit.

A cut 25 micron thick PPC film 20 as produced in FIG. 2 positioned onto a tapecast layer of LiCoO$_2$ particles 16 with Al foil 15. In this procedure, LiNO$_3$/KNO$_3$ electrolyte mixture used in Example 2 was placed onto the PPC film—this amount of electrolyte is sufficient to infiltrate both the PPC film and LiCoO$_2$ electrode powder and LiAl powder anode 18 with Cu foil 17. The arrangement of materials is then passed through an inert gas tunnel furnace at about from 130-210° C., preferably 160-200° C., most preferably 170-190° C. After the electrolyte melts and infiltrates the two component layers, the electrolyte-to-separator weight ratio is about 50:50 and the electrolyte-to-LiCoO$_2$ cathode weight ratio is about 40:50. The electrolyte-infiltrated PPC film becomes laminated to the LiCoO$_2$/electrolyte and graphite/electrolyte layers via the infiltrated electrolyte salt. FIG. 4 illustrates the electrochemical charging of the uncharged graphite/LiCoO$_2$ cell, including a PPC film separator to 3.8 volt open circuit.

EXAMPLE 5

PCC Film Laminated with a Tapecast Uncharged-State Electrode

Figure 6:
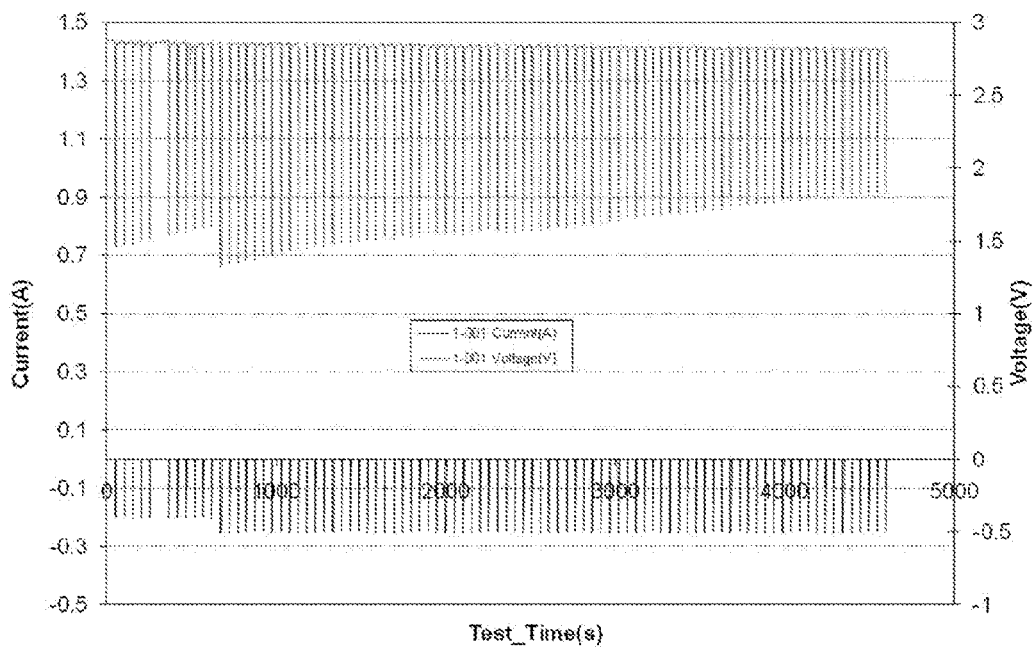
FIG. 6 is a continued cell voltage/time plot of a Li (C)/ $LiMnO_2$ cell (fabricated in charged state) with molten nitrate at 180° C. including a PPC film separator with 1 sec pulses at 0.2 A/cm² to in excess of 3 h operation.

A tapecast electrode is comprised of particles held together in 2-5 volume percent of a polymer matrix 15/16. A PCC film comprising a 50:50 weight ratio electrolyte-to-MnO$_2$ cathode, as formed FIG. 1, is positioned onto a tapecast piece of cathode material (i.e., a powder bed of 50 volume percent LiMn$_2$O$_4$ and graphite (C) particles in a 9:1 weight ratio, respectively) of the same size and shape and the stack is placed onto a conveyor belt that runs through a tunnel furnace. About 0.3 g of the LiNO$_3$/KNO$_3$ electrolyte material used in Example 2 is placed onto the PCC film, which then is passed through the tunnel furnace at 150° C.-210° C., preferably 160-200° C., most preferably 160-190° C. Because of reduced Li-activity, the uncharged-state cells lessen inert process atmosphere requirements. After the electrolyte melts and infiltrates the two component layers, the electrolyte-to-separator weight ratio is 50:50 and the electrolyte-to-cathode weight ratio is 22:78. The electrolyte-infiltrated PPC film is laminated to the cathode/electrolyte pellet via the infiltrating electrolyte. The laminated PPC film/cathode component which possesses superior handling strength compared to conventional MgO-based separator material is then stacked (or even spiral or flat wound) with polymer-bonded carbon electrode/electrolyte pellet to form a thermal battery cell. The assembled cell is heated and charged to full capacity. Subsequently, the battery is packaged with a heat source to operate as a thermal battery, FIG. 6 is an example of the cell discharge performance subsequent to charging and electrolyte freeze, voltage/time plot of the now Li (C)/MnO$_2$ cell (fabricated in uncharged state) with molten nitrate at 180° C. including a PPC film separator to supply 1 sec pulses at 0.2 A/cm$^2$ for in excess of 3 hours of operation.

In summary, the PPC film materials of the present invention have the following beneficial properties: MOR of Salt-Loaded Parts (>2000 psi); Average bulk density without electrolytes (0.3 g/cm$^3$); Typical Open Volume (30-75 percent); Thickness range (0.002-0.0003 inches); Tensile Strength (>350 g/in); and Maximum Use Temperature (about 250 C). Table 3 illustrates typical values for important characteristics of a PCC film of the invention compared to those of a pressed MgO powder for use as a separator in a thermal battery cell.

TABLE 3

| Separator Comparison for Thermal Battery | | | |
|---|---|---|---|
| Characteristics: | MgO Powder Pellet | PPC Film | Ceramic Fiber Separator |
| Thickness | 10-25 mil | 0.3-1.2 mil | 6-12 mil |
| Cost, percent of Total | ~3 percent | ~5 percent | ~10 percent |
| Size Limitation | 3.5 in Diameter | Up to 10 inch Dia. | 10 inch Dia. |
| Handling | Brittle | Flexible | some flexure |
| Electrolyte Content | 50-70 vol % | 50-70 vol % | 75-90 vol % |

Figure 5:
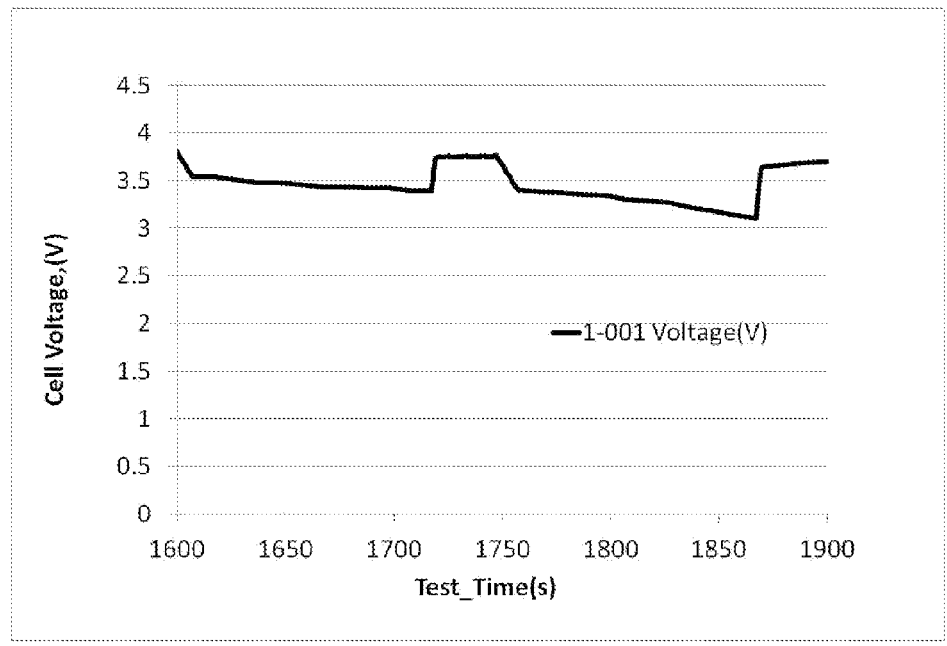
FIG. 5 is a cell voltage/time plot of a constant current discharge of a Li (C)/lithium cobalt oxide (LCO) cell including molten nitrate electrolyte at 180° C. Average discharge voltage of 3.75 volts from midpoint open circuit at constant current discharge of carbon/LCO (lithium-cobalt-oxide) with open circuit (3.75 V) at midpoint of discharge capacity.

FIG. 5 is a cell voltage/time plot of a constant current discharge of a Li (C)/lithium cobalt oxide (LCO) cell including molten nitrate electrolyte at 180° C. Average discharge voltage of 3.75 volts from midpoint open circuit at constant current discharge of carbon/LCO (lithium-cobalt-oxide) with open circuit (3.75 V) at midpoint of discharge capacity.

Figure 7:
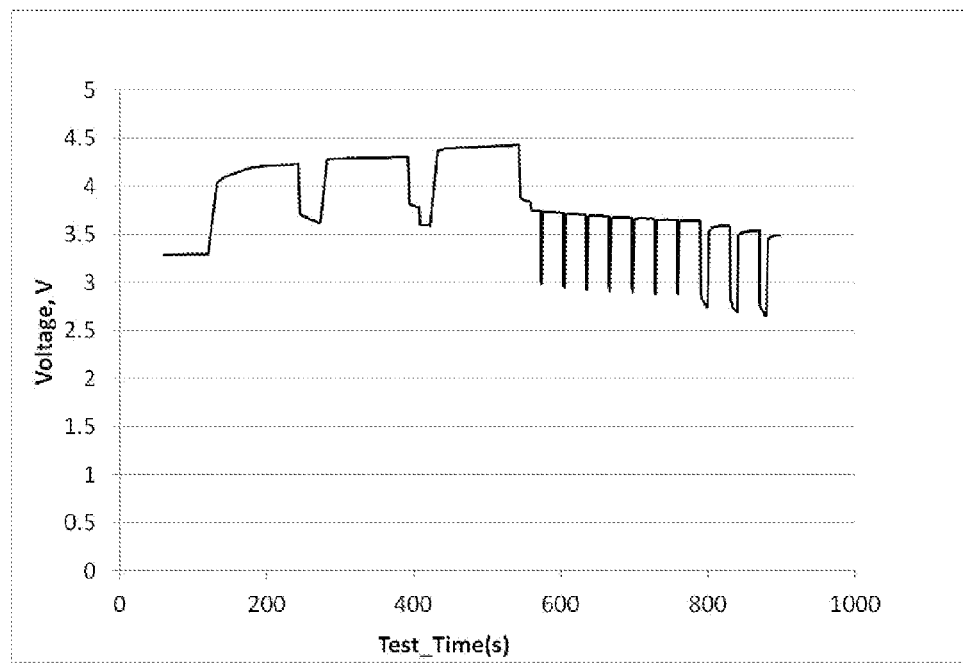
FIG. 7 is a cell voltage/time plot of a Carbon/$LiMnNiCoO_x$ cell (uncharged-state cell fabrication) with molten nitrate at 180° C. including a PPC film separator. The cell is charged and subsequently pulse discharged with 1 sec pulses and 10 s pulses of a carbon/NMC (lithium-nickel-manganese-cobalt oxide) cell with molten nitrate electrolyte at 180° C. Cell is charged to 4.45 volts with 3.7 volt open circuit, then discharge pulses with about 3 volts under load.

FIG. 7 is a cell voltage/time plot of a Carbon/LiMnNiCoO$_x$ cell (uncharged-state cell fabrication) with molten nitrate at 180° C. including a PPC film separator. The cell is charged and subsequently pulse discharged with 1 sec pulses and 10 s pulses of a carbon/NMC (lithium-nickel-manganese-cobalt oxide) cell with molten nitrate electrolyte at 180° C. Cell is charged to 4.45 volts with 3.7 volt open circuit, then discharge pulses with about 3 volts under load.

EXAMPLE 6

Ceramic Fiber Separator with Uncharged Carbon/LiCoO$_2$ Electrode

Example 6 (uncharged-state cell fabrication) including a ceramic fiber separator and molten nitrate at 180° C. The cell with 250 micron thick separator with uncharged tapecast electrodes carbon/Li-Cobalt-oxide is initially charged to 4.2 volts and allowed to freeze (i.e., solidified nitrate). FIG. 8, voltage/time plot of the reheated charged Carbon/LiCoO$_2$ cell with molten nitrate at 180° C. is then discharged with 1 s pulse power delivery as is typical of a thermal battery.

The PPC films of the present invention are flexible and highly porous, making these materials an excellent replacement for reduced temperature MgO separators in thermal battery applications, even at thicknesses of 0.3 to 1.2 mils.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term consisting of is to be construed as limiting the scope to specified materials or steps. The term consisting essentially of is to be construed as limiting the scope to specified materials or steps and those that do not affect the basic and novel characteristics of the claimed invention. Recitation of ranges of values herein are merely intended to serve as a shorthand method of referring individually to each separate value falling within the range, unless otherwise indicated herein, and each separate value is incorporated into the specification as if it were individually recited herein. Recitation of numbers values are to be interpreted as including known suitable margins of measurement error consistent with the technique exemplified as being used to determine the value. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A flexible, porous polymer composite film comprising 50 percent to 90 percent by weight of the porous polymer composite film of a polymer and 10 percent to 50 percent by weight of the porous polymer composite film of an electrically non-conductive porous ceramic; wherein the electrically non-conductive porous ceramics comprise MgO, $Al_2O_3$, $AlSiO_2$, BN, AlN, or a mixture of two or more of the foregoing; and the electrically non-conductive porous ceramic interconnects providing a porous network of electrically non-conductive porous ceramic having a porosity of not less than 30 percent by volume; the pores of the network containing an alkali metal nitrate/nitrite electrolyte in an amount of up to 70 percent by volume based on pore volume of the network.

2. The flexible, porous polymer composite film of claim 1, wherein the alkali metal nitrate/nitrite comprises a lithium nitrate/nitrite salt.

3. The flexible, porous polymer composite film of claim 1, wherein the alkali metal nitrate/nitrite comprises a mixture of $LiNO_3$, $LiNO_2$, $KNO_3$, organic additive, and combinations thereof.

4. The flexible, porous polymer composite film of claim 1, wherein the electrically non-conductive porous ceramic comprises MgO, $Al_2O_3$, $AlSiO_2$, or a combination thereof.

5. The flexible, porous polymer composite film of claim 1, wherein the ceramic comprise 50 percent to 95 percent by weight MgO and 5 percent to 50 percent by weight $AlSiO_2$.

6. The flexible, porous polymer composite film of claim 1 wherein the ceramic has a surface area of about 5 and 25 square meters per gram.

7. A combination of laminated electrodes and porous separator film are combined including an electrolyte within the porous separator film, the combination comprising layers of powdered cathode material and anode material adhering to a surface of a separator film with an electrolyte therebetween; the separator film comprising 5 percent to 50 percent by weight of the separator film of an electrically non-conductive ceramic and from about 50 to about 95 weight percent of the separator film of a thermoplastic; wherein the electrically non-conductive ceramic comprise MgO, $Al_2O_3$, $AlSiO_2$, BN, AlN, or a mixture of two or more of the foregoing; and the electrically non-conductive ceramic with a porous interconnected network having a porosity of not less than 30 percent by volume; the pores of the network containing an alkali metal nitrate/nitrite electrolyte in an amount of up to 70 percent by volume based on pore volume of the network with the electrodes to form an electrochemical cell.

8. The combination of claim 7, wherein the cathode material is selected from the group consisting of Mn, Fe, Co, Cu, Ni, and combinations thereof.

9. The combination of claim 7, wherein the separator film contains MgO, is less than 12 mils thick and includes an electrolyte containing $LiNO_3$ present in an amount in the range of 70 percent to 30 percent by volume of the porous film.

10. The combination of claim 7 wherein the electrically non-conductive ceramic has a surface area of from about 5 to about 30 square meters per gram.

11. An electrochemical cell comprising a lithium-containing anode material and a powdered cathode material separated by a flexible, porous separator film of claim 9, the film being less than 1.2 mils in thickness, and including an alkali metal nitrate electrolyte in the pores thereof, in an amount of up to 70 percent by volume.

12. The electrochemical cell of claim 11 includes uncharged-state electrodes.

13. A battery including a plurality of the electrochemical cells of claim 11, connected in series or parallel.

14. The combination of claim 7, wherein the cathode material is selected from the group consisting of $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $Li(Li_\alpha Ni_x Mn_y Co_z)O_2$, and combinations thereof.

15. The combination of claim 7, wherein the anode material is selected from the group consisting of $LiC_6$ graphite, $LiC_6$ hard carbon, $Li_4Ti_5O_{12}$, $Li_{4.4}Si$, LiAl, and combinations thereof.

16. The combination of claim 7, wherein the alkali metal nitrate/nitrite is selected from the group consisting of $LiNO_3$, $KNO_3$, $NaNO_3$, $NaNO_2$, and combinations thereof.

17. The combination of claim 7, wherein the cathode material is selected from the group consisting of $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $Li(Li_\alpha Ni_x Mn_y Co_z)O_2$, and combinations thereof, wherein the anode material is selected from the group consisting of $LiC_6$ graphite, $LiC_6$ hard carbon, $Li_4Ti_5O_{12}$, $Li_{4.4}Si$, LiAl, and combinations thereof, and wherein the alkali metal nitrate/nitrite is selected from the group consisting of $LiNO_3$, $KNO_3$, $NaNO_3$, $NaNO_2$, and combinations thereof.

18. The combination of claim 7, defining an electrochemical cell, wherein a plurality of said electrochemical cells are connected in series or parallel to define a battery.

* * * * *